June 13, 1961 W. KOWALCZYK 2,988,136
CONVERTIBLE COMBINATION INFANT'S CHAIR, BED, AND FEEDING APPARATUS
Filed March 23, 1959 2 Sheets-Sheet 1

INVENTOR.
WALTER KOWALCZYK

June 13, 1961 W. KOWALCZYK 2,988,136
CONVERTIBLE COMBINATION INFANT'S CHAIR, BED, AND FEEDING APPARATUS
Filed March 23, 1959 2 Sheets-Sheet 2

INVENTOR.
WALTER KOWALCZYK

United States Patent Office 2,988,136
Patented June 13, 1961

2,988,136
CONVERTIBLE COMBINATION INFANT'S CHAIR, BED, AND FEEDING APPARATUS
Walter Kowalczyk, 3396 12th St., Wyandotte, Mich., assignor of one-tenth part to The Gadget-Of-The-Month Club, Inc., North Hollywood, Calif., a corporation of California
Filed Mar. 23, 1959, Ser. No. 801,041
5 Claims. (Cl. 155—49)

The present invention consists of a combination convertible infant's chair, bed, and feeding apparatus of a type including a base framework, a front substantially U-shaped member, and a rear substantially U-shaped member, each having junction ends pivotally interconnected with respect to each other for relative pivotal movement around a horizontal axis positioned above substantially the center of said base framework and pivotally held there by inverted triangularly-shaped supporting means extending upwardly from the base framework, with said pivotally interconnected U-shaped members being provided with removable flexible thin-sheet cover means which extends across and above the horizontal axis whereby to provide two pivotally angularly relatively adjustable panel portions which together comprise a convertible chair or bed structure which is operative as a chair when the rear panel portion is upwardly inclined with respect to the front panel portion and which is operative as a bed when both the front and panel portions are adjusted into substantially co-planar relationship or into near equivalents thereof. Furthermore, the apparatus includes longitudinally controllably adjustable end support members interconnecting the front portion of the base framework and the corresponding front portion of the front U-shaped member and also interconnecting the rear portion of the base framework and the corresponding rear portion of the rear U-shaped member whereby each of said U-shaped members and the corresponding panel portions may be individually adjustably supported in any selected angular relationship.

In one preferred form of the invention, the rear U-shaped member is provided adjacent its junction ends with an object supporting member extending across and spacedly positioned in front of the rear panel portion and lying in a plane substantially perpendicular to the plane in which the rear U-shaped member lies, with the object supporting member being further provided with removable positionally adjustable object-carrying means for positioning and carrying an object such as a nursing bottle or dishes of baby food or the like in a selected use location conveniently accessible to an infant resting upon the thin-sheet cover means of the front and rear panel portions.

One preferred form of the invention may include adjustable infant-supporting flexible crotch strap means having one end attached to the thin sheet cover means and having the other end provided with adjustable fastening means cooperable with the object-supporting member whereby a baby may be positively held and supported with respect to the apparatus.

It is an object of the present invention to provide an improved combination convertible infant's chair, bed, and feeding apparatus which may be caused to assume a normal chair-like configuration for supporting an infant in the manner of a chair, which may be caused to assume a normal bed-like configuration for supporting an infant in the manner of a bed, and which may be caused to assume any position between the chair-like position and the bed-like position.

It is a further object to provide a device of the character set forth in the preceding object, which includes an adjustable crotch strap means adapted to positively hold the infant in a fail-safe manner so that he cannot accidentally fall out of the apparatus.

It is a further object to provide apparatus of the character set forth in any of the preceding objects, which includes a front and rear panel portion which are independently adjustable with respect to each other around a horizontal axis at a junction region where said two panel portions are pivotally interconnected.

It is a further object to provide apparatus of the character set forth in any of the preceding objects, which includes an object supporting member provided with adjustable object carrying means for positioning and carrying an object in a selected use location accessible to an infant carried by the device.

It is a further object to provide apparatus of the character set forth in any of the preceding objects, which is of extremely simple, cheap, foolproof construction such as to be conducive to widespread use of the apparatus.

Further objects will be apparent to persons skilled in the art after a careful study hereof.

For the purpose of clarifying the nature of the present invention, one exemplary embodiment (with two alternative types of object-carrying means) is illustrated in the hereinbelow-described figures of the accompanying two sheets of drawings, and is described in detail hereinafter.

FIG. 1 is a reduced-sized perspective view of one exemplary form of the invention showing it in a position between an extreme chair-simulating position and an extreme bed-simulating position—in other words, an in-between position suitable for feeding an infant by means of a nursing bottle containing milk and effectively supported in the proper location by an object-supporting member provided with adjustable object-carrying means of one type.

FIG. 8 illustrates the bottom portion of the object-carrying means which has its top portion shown in FIG. 7.

Referring specifically to the figures, one exemplary form of the invention includes a tubular base framework, indicated generally at 20, which is of substantially rectangular configuration as seen in plan view, and which lies substantially entirely in a flat horizontal plane, and which includes a transverse front portion 21, a transverse back portion 22, a longitudinal left side portion 23, and a longitudinal right side portion 24.

Figure 3:
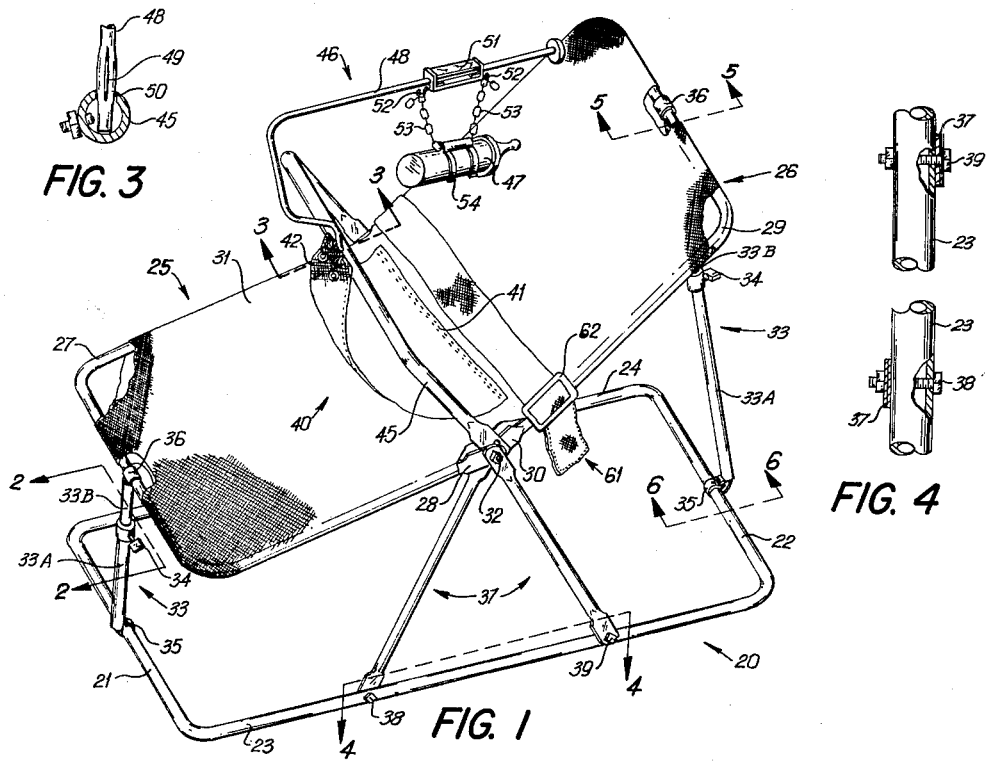
FIG. 3 is a fragmentary enlarged vertical sectional view of the object-supporting member and the object-carrying means associated therewith as taken in the direction of the arrows 3—3 of FIG. 1.
Figure 4:
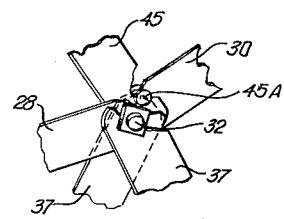
FIG. 4 is a fragmentary top plan view, partly in section, taken in the direction of the arrows 4—4 of FIG. 1.
Figure 1:
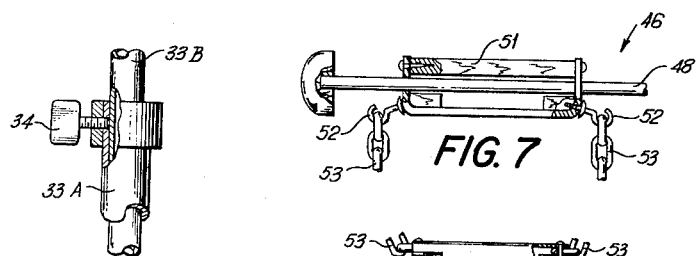
Figure 7:
FIG. 7 is an enlarged, partly vertical sectional, view of the top portion of the object-carrying means shown in FIG. 1 in a reversed position.
Figure 7:
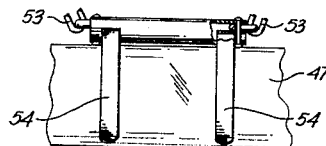
Figure 2:
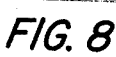
FIG. 2 is an enlarged fragmentary, partly sectional view taken in the direction of the arrows 2—2 in FIG. 1 and shows the adjustable telescopic engagement of one (the front one) of the longitudinally controllably adjustable end support members—it being understood that the other or rear end support member is similarly constructed.
Figure 8:
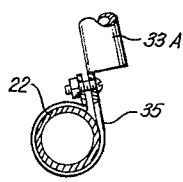
FIG. 8 is another fragmentary enlarged view showing the bottom portion of the object-carrying means of FIG. 1 as seen in a reversed position. In other words.
Figure 10:
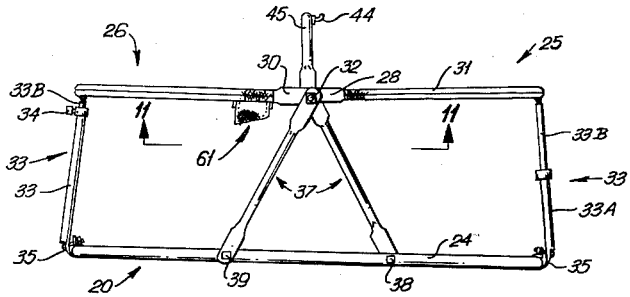
FIG. 10 is an elevational view of the apparatus as seen from the opposite side of FIG. 1 when the two panel portions have been adjusted so as to be virtually coplanar, whereby to cause the entire device to assume a bed-like configuration.
Figure 12:
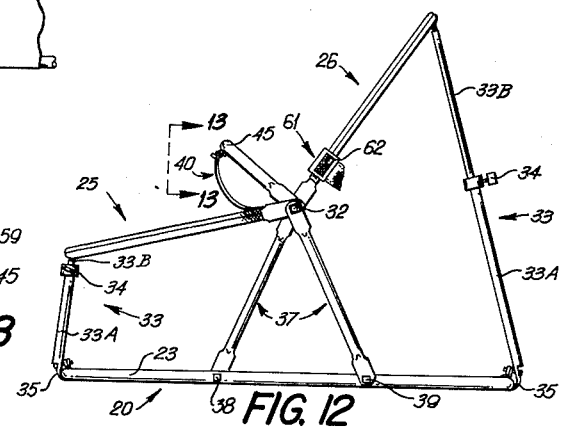
FIG. 12 is an elevational view of the apparatus of FIG. 1 with the rear panel portion moved to its extreme upper position simulating a chair-like configuration.
Figure 16:
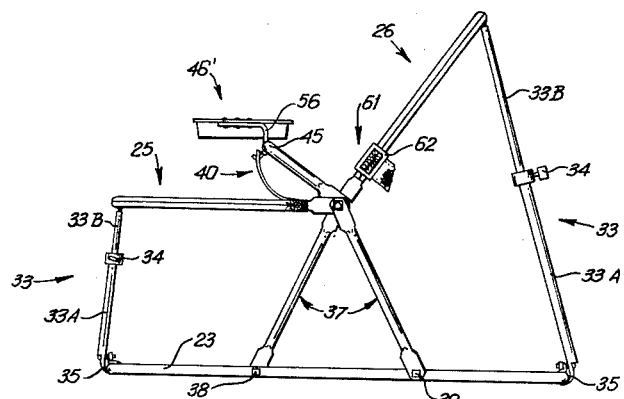
FIG. 16 is a view of the apparatus of FIG. 12 with the object-supporting tray of FIG. 15 carried thereby in a normal infant-feeding position.
Figure 13:
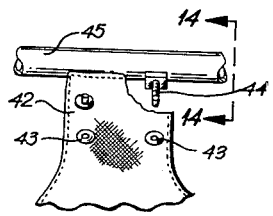
FIG. 13 is an enlarged fragmentary view taken in the direction of the arrows 13—13 of FIG. 12 and shows the adjustable fastening or connection of the free end of the adjustable infant-supporting crotch strap means with respect to the object-supporting member or tube.

The exemplary embodiment also includes a front panel portion, indicated generally at 25, and a rear panel portion, indicated generally at 26, with the front panel portion 25 consisting of a front substantially U-shaped member 27 having two similar junction ends, such as the near one shown at 28 (it being understood that the far junction end is of similar construction), and with the rear panel portion 26 consisting of an oppositely directed substantially U-shaped member 29 having two similar junction ends, such as the near one shown at 30 (it being understood that the far junction end is of similar construction), and with the U-shaped members 27 and 29 removably carrying thereon thin-sheet cover means 31 which extends the entire length of both of the U-shaped members 27 and 29. It should be noted that the junction ends 28 and 30 on each side of the U-shaped frames 27 and 29 are pivotally connected by pivotal fastening means such as the near pivotal fastening means 32 shown in Fig. 1 (it being understood that the far pivotal fastening means is of similar but oppositely directed construction and positioning), so as to effectively pivotally interconnect the front and rear panel portions 25 and 26 for relative pivotal movement around a horizontal axis aligned with the two pivotal fastening means 32 whereby the front and rear panel portions 25 and 26 may be adjusted from the extreme chair-simulating position shown in Figs. 12 and 16 into the extreme bed-simulating position shown in Fig. 10, or into any position therebetween.

The exemplary embodiment of the invention illustrated, also includes two longitudinally controllably adjustable end support members, such as the front end support member indicated generally at 33 and the rear end support member indicated generally at 33, respectively, interconnecting the front portion 21 of the base framework 20 and the corresponding front portion of the front U-shaped member 27, an interconnecting the rear portion 22 of the base framework 20 and the rear portion of the rear U-shaped member 29, whereby each of said U-shaped members 27 and 29 may be individually adjustably supported in any selected angular relationship. It should be noted that the bottom ends of each of the end support members 33 are fastened by suitable fastening means, such as indicated at 35, to the corresponding portions 21 and 22 of the base framework 20. The upper ends of the end support members 33 are provided with similar fastening means 36 for fastening them to the end members, respectively, of the front and rear U-shaped members 27 and 29. It should also be noted that the near triangular support means, indicated generally at 37, is fastened at the top to the pivotal fastening means 32 and is fastened inside and outside of the side longitudinal portion 23 of the frame 20 by suitable threaded fastening means such as indicated at 38 and 39. It should be understood that the far side 24 of the device is also provided with similar triangular fastening means 37. Each of the end support members 33 includes a lower tubular support member 33A and an upper smaller diameter tubular support member 33B telescopically engaged in the tubular support member 33A and adjustably lockable in any selected position by screw-threaded locking means 34 whereby to be capable of being locked at any selected overall length.

Figure 9:
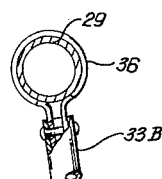
FIG. 9 is a fragmentary enlarged perspective view, partly broken away, showing one of the junctions where the junction ends of the front and rear U-shaped members are interconnected and supported by triangularly-shaped supporting means at a predetermined height above the base framework, as is clearly shown in FIG. 1.
Figure 6:
FIG. 6 is a fragmentary enlarged view, partly in section, taken in the direction of the arrows 6—6 of FIG. 1.
Figure 5:
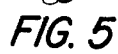
FIG. 5 is a fragmentary enlarged view, partly in section, taken in the direction of the arrows 5—5 of FIG. 1.

The exemplary embodiment illustrated also includes adjustable infant-supporting flexible crotch strap means such as is indicated generally at 40 and which usually consists of a piece of fabric or the like having a fairly broad rear end fastened as indicated at 41 to the fabric cover means 31 and having a free end 42 provided with adjustable fastening means comprising a plurality of spaced eyeleted holes 43 removably cooperable with corresponding hook means 44 carried by a tubular member 45 which comprises an object-supporting member fastened at each end (one of which is shown in FIG. 9 at 45A) to the U-shaped member 29 at the junction ends 30 thereof in a manner such as to lie substantially perpendicular to the plane of the U-shaped member 29, thus providing an arrangement, clearly shown in FIGS. 1, 12, 13, and 16, adapted to firmly hold a baby in position on the entire device.

Figure 17:
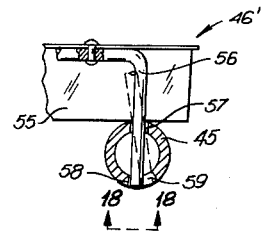
FIG. 17 is an enlarged fragmentary partly sectional view taken in the direction of the arrows 17—17 of FIG. 15.
Figure 15:
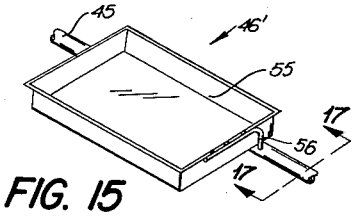
FIG. 15 is a perspective view of one form of object-carrying means comprising a food-supporting tray.
Figure 14:
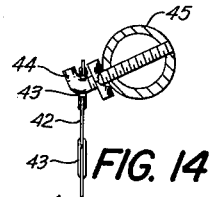
FIG. 14 is an enlarged fragmentary view, partly in vertical section, taken in the direction of the arrows 14—14 of FIG. 13.
Figure 18:
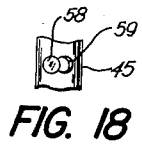
FIG. 18 is a fragmentary bottom view taken in the direction of the arrows 18—18 of FIG. 17, with tray removed for clarity.

The object-supporting member 45 is adapted to be additionally provided with adjustable object-carrying means for positioning and carrying an object in a selected use location accessible to an infant resting upon the thin-sheet cover means 31. In the specific example illustrated in FIGS. 1, 3, 7, and 8, the adjustable object carrying means takes one specific form, as indicated generally at 46, wherein it comprises apparatus for carrying in a convenient accessible location a nursing bottle, such as that indicated at 47. In this form, the object-carrying means 46 comprises a curved rod 48 having a splined or otherwise keyed end portion 49 adapted to be received in a correspondingly-shaped aperture 50 in the top of the tubular member 45 whereby to be effectively removably and adjustably positioned in the manner best shown in FIG. 1, and to slidably carry a member 51 having hooks 52 at each end thereof adapted to adjustably support chain means 53 having fastened to the lower end thereof a resilient spring fastener 54 adapted to removably grip the sides of the nursing bottle 47 for holding it in a manner whereby it may be virtually universally rectilinearly and/or angularly adjusted so as to be capable of being properly positioned to feed a baby resting on the panel portions 25 and 26. The object-carrying means may take an alternate form, as indicated at 46' in FIGS. 15, 16, and 17, wherein it comprises a tray 55 having projection elements 56 at each end similar to the near projection element 56 shown in FIG. 15 and each adapted to be received in corresponding apertures in the bar 45 such as the near top aperture 57 shown in FIG. 17. It should be noted that the top apertures 57 are oversize with respect to the projections 56 so that the projections 56 may be selectively alignable with bottom apertures 58 or 59 whereby the tray 55 may be caused to assume either of two different positions such as the normal feeding position shown in FIG. 16 or an angularly displaced, but also substantially horizontal feeding position when the rear panel portion 26 is in an in-between position generally similar to that shown in FIG. 1.

Figure 11:
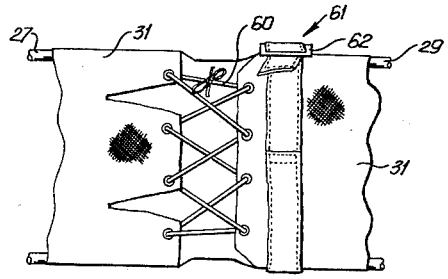
FIG. 11 is an end-for-end reversed fragmentary bottom plan view taken in the direction of the arrows 11—11 of FIG. 10.

It should be noted that the cover means 31 consists of a top continuous panel of material and socketed or recessed opposed end portions adapted to be drawn over the opposite ends of the two U-shaped members 27 and 29 and then laced together by suitable lacing means thereunder such as is shown at 60 in FIG. 11. Therefore, it will readily be understood that when one wishes to wash the fabric cover member 31, all that is necessary is to unlace the lacing means 60, completely disengage the upper and lower portions of the end support members 33, fold the two panel portions 25 and 26 together and then slidably remove the cover 31. It may then be washed and subsequently replaced.

The cover member 31 in a region covering part of the rear panel portion 26 is provided with suitable fastening strap means, such as is indicated generally at 61, which is provided with buckle means 62 so that a child may be positively fastened into the apparatus thereby if desired.

It should be noted that the apparatus may be used as a chair, as a bed, or as feeding apparatus, and that these functional uses of the device are relatively interchangeable, since the apparatus can be very easily adjusted from one to the other of the possible configurations for use in any of these manners.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A convertible combination infant's chair, bed, and feeding apparatus, comprising: a base framework of substantially rectangular configuration as seen in plan view and lying substantially entirely in a flat horizontal plane, said base framework including a transverse front portion, a transverse back portion, a longitudinal left side portion, and a longitudinal right side portion; a front substantially U-shaped member and a rear substantially U-shaped member, each having junction ends pivotally interconnected with respect to each other for relative pivotal movement around a horizontal axis inverted triangularly shaped supporting means extending upwardly from the left and right side portions of the base framework and each terminating in an apex controllably lockably pivotally mounting said pivotally interconnected junction ends of said front and rear substantially U-shaped members; said U-shaped members being provided with removable flexible thin-sheet cover means mounted thereon and being effectively connected and extending across and above the imaginary horizontal axis coincident with the pivotal interconnection of said junction ends whereby to provide front and rear pivotally angularly relatively adjustable thin-sheet panel portions together comprising a structure operative as a chair when said rear panel portion is upwardly inclined with respect to said front panel portion and operative as a bed when said rear panel portion and said front panel portion are adjusted into substantially co-planar relationship; and longitudinally controllably adjustable end support members interconnecting the front portion of said base framework and the corresponding front portion of the front U-shaped member and interconnecting said rear portion of said base framework and the corresponding rear portion of said rear U-shaped member whereby each of said U-shaped members may be individually adjustably supported in any selected angular relationship with respect to the other U-shaped member.

2. Apparatus of the character defined in claim 1, wherein said rear U-shaped member is provided adjacent its junction ends with an object supporting member extending across and spacedly positioned in front of the thin-sheet cover means carried by said U-shaped member and lying in a plane substantially perpendicular to the plane in which said rear U-shaped member lies.

3. Apparatus of the character defined in claim 1, fherein said rear U-shaped member is provided adjacent its junction ends with an object supporting member extending across and spacedly positioned in front of the thin-sheet cover means carried by said U-shaped member and lying in a plane substantially perpendicular to the plane in which said rear U-shaped member lies, said object supporting member being provided with removable positionally adjustable object-carrying means for positioning and carrying an object in a selected use location accessible to an infant resting upon the thin-sheet cover means.

4. Apparatus of the character defined in claim 1, wherein said rear U-shaped member is provided adjacent its junction ends with an object supporting member extending across and spacedly positioned in front of the thin-sheet cover means carried by said U-shaped member and lying in a plane substantially perpendicular to the plane in which said rear U-shaped member lies, said object supporting member being provided with removable positionally adjustable object-carrying means for positioning and carrying an object in a selected use location accessible to an infant resting upon the thin-sheet cover means, and including adjustable infant-supporting flexible crotch strap means having one end attached to said thin-sheet cover means and having the other end provided with adjustable fastening means cooperable with said object supporting member.

5. Apparatus of the character defined in claim 1, wherein said rear U-shaped member is provided adjacent its junction ends with an object supporting member extending across and spacedly positioned in front of the thin-sheet cover means carried by said U-shaped member and lying in a plane substantially perpendicular to the plane in which said rear U-shaped member lies, said object supporting member being provided with removable positionally adjustable object-carrying means for positioning and carrying an object in a selected use location accessible to an infant resting upon the thin-sheet cover means, including adjustable infant-supporting flexible crotch strap means having one end attached to said thin-sheet cover means and having the other end provided with adjustable fastening means cooperable with said object supporting member, and including fastening strap means carried by said rear panel portion for encircling engagement around the body of an infant resting on said panel portion.

References Cited in the file of this patent

UNITED STATES PATENTS

| | | |
|---|---|---|
| 1,945,781 | Kersten | Feb. 6, 1934 |
| 2,520,094 | Hand | Aug. 22, 1950 |
| 2,664,940 | High | Jan. 5, 1954 |
| 2,712,349 | LeVoir | July 5, 1955 |
| 2,713,890 | Mack | July 26, 1955 |
| 2,851,084 | Benjetsky | Sept. 9, 1958 |